United States Patent [19]

Haygood

[11] Patent Number: 4,978,700
[45] Date of Patent: Dec. 18, 1990

[54] EXTRUDABLE ANTI-STATIC POLYVINYL CHLORIDE RESIN COMPOSITIONS, AND SHAPED ARTICLES FORMED THEREOF

[75] Inventor: David L. Haygood, Florence, Ala.

[73] Assignee: Edward S. Robbins, III, Florence, Ala.

[21] Appl. No.: 323,878

[22] Filed: Mar. 15, 1989

Related U.S. Application Data

[63] Continuation-in-part of Ser. No. 60,275, Jun. 10, 1987, abandoned.

[51] Int. Cl.$^5$ .......................... C08K 5/41; C08K 5/19; C08K 3/08
[52] U.S. Cl. ..................... 524/156; 524/245; 524/249; 524/399; 524/439
[58] Field of Search ............... 524/249, 245, 156, 399; 523/453

[56] References Cited

U.S. PATENT DOCUMENTS

| | | | |
|---|---|---|---|
| 3,274,135 | 9/1966 | Norman et al. | 524/399 |
| 3,390,111 | 6/1968 | Scullin et al. | 524/399 |
| 3,445,440 | 5/1969 | Susi et al. | 524/156 |
| 3,567,681 | 3/1971 | Weisfeld et al. | 524/399 |
| 3,728,282 | 4/1973 | Barie et al. | 524/399 |
| 4,000,107 | 12/1976 | Galland et al. | 524/296 |
| 4,081,413 | 3/1978 | Tybus et al. | 524/569 |
| 4,661,544 | 4/1987 | Quinn | 524/399 |
| 4,661,547 | 4/1987 | Harada et al. | 524/567 |

*Primary Examiner*—Lewis T. Jacobs
*Attorney, Agent, or Firm*—Nixon & Vanderhye

[57] ABSTRACT

Extrudable anti-static polyvinyl chloride (PVC) compositions include a quaternary ammonium compound as an anti-static agent, and a barium-cadmium-zinc component as a stablizing agent. The barium-cadmium-zinc component has been found to be critically required in order for the compositions to be processable (e.g., via extrusion) while retaining their desired anti-static characteristics. Shaped articles (e.g., floor mats, door strippings, and the like) may be formed from the compositions of this invention, and use in environments where static-charge dissipation is desired (e.g., computer rooms, hospitals, and the like).

14 Claims, 1 Drawing Sheet

EXTRUDABLE ANTI-STATIC POLYVINYL CHLORIDE RESIN COMPOSITIONS, AND SHAPED ARTICLES FORMED THEREOF

RELATED APPLICATIONS

This application is a continuation-in-part of commonly owned, and copending U.S. application Ser. No. 07/060,275 entitled "Anti-Static Products", filed on June 10, 1987, now abandoned in the name of the present inventor, the entire content of the same being expressly incorporated hereinto by reference.

FIELD OF THE INVENTION

The present invention relates to extrudable anti-static polyvinyl chloride resin compositions, and to shaped articles formed thereof. More specifically, the present invention relates to anti-static mats, anti-static stripping and other anti-static supports for work places. For example, the compositions and shaped articles of the present invention may take the form of floor mat, door strippings or other support means finding particular utility in offices, hospitals, computer rooms and other environments requiring physical protection of floor and/or other surfaces while simultaneously affording exceedingly rapid dissipation of static charge buildup.

BACKGROUND OF THE INVENTION

Static electricity is recognized, for example, as a prime cause of program errors, lost data, and computer downtime. There have been several prior efforts to achieve solutions to the problem of providing an anti-static product for the workplace or other environments in which sensitive computer equipment, electronic medical equipment or the like are operated.

For example, in U.S. Pat. No. 3,117,113 to Tudor (the entire content of which is expressly incorporated hereinto by reference), it is disclosed that the use of quaternary ammonium salts may be blended with PVC resin to provide static electricity dissipative effects. This patent also mentions that the PVC compositions may include, in addition to the quaternary ammonium salt, a variety of additives, including plasticizers, stabilizers, fillers, and colorants.

U.S. Pat. No. 4,661,547 discloses an anti-static material containing a base material which is rubber and/or polyvinyl chloride resin, to which are added a cationic quaternary ammonium salt and polyethylene glycol, and optionally aluminum hydroxide or calcium carbonate. At column 4, lines 6–10 it is disclosed that plasticizers such as DOP, DHP, DOA or the like, a Ba-Zn stabilizing agent for plastics, or a high molecular weight acrylic work assisting agent or the like may be added.

Anti-static formulations of PVC resin are also disclosed in U.S. Pat. No. 3,975,325 to Long, Jr. as including (a) a zinc salt of a C8-22 fatty acid or a mixture of a zinc salt of C8-22 fatty acid and a calcium salt of a C8-22 fatty acid, (b) a tertiary amine, or (3) a mixture of a tertiary amine with a higher aliphatic alcohol.

Hydroxyalkyl quaternary ammonium ethers as anti-static agents are disclosed in U.S. Pat. No. 3,445,440 to Susi et al. In particular, the antistatic agents disclosed in this patent are said to posses high thermal stability which minimize the degradative effects of elevated temperatures.

Another PVC formulation is disclosed in Tybus et al, U.S. Pat. No. 4,081,413. This patent generally discloses that PVC compositions having an impact modifying agent may also include a variety of stabilizers. Specifically, it is disclosed that metal salts of fatty acids, particularly those of calcium, zinc, tin, barium and magnesium, di-organo-tin compounds. As best as applicant can determine, however, no suggestion of imparting anti-static properties to such PVC compositions is disclosed therein.

SUMMARY OF THE INVENTION

The present invention is directed to a novel polyvinyl chloride composition having anti-static properties. Moreover, the compositions of the present invention exhibit the desired processing characteristics necessary to overcome the degradative effects of melt blending and extrusion to form shaped articles therefrom.

More specifically, it has been determined that anti-static PVC resin compositions having satisfactory extrusion processing characteristics may be obtained through a blend of PVC resin, a quaternary ammonium compound, a barium-cadmium-zinc stablilizer, and a plasticizer. Resin compositions of the present invention may thus be extruded to form shaped articles which exhibit desired anti-static properties.

It has thus been found that, when quaternary ammonium salts are employed in PVC resin compositions for purposes of imparting anti-static properties thereto, such compositions must also include a barium-cadmium-zinc composition as a stabilizer in order to provide the necessary extrusion processing characteristics and visual appearance for shaped articles.

These, as well as other, aspects and advantages of this invention will become evident from the detailed description of the preferred exemplary embodiments of this invention which follow.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is a schematic representation of an exemplary chair mat formed of the PVC composition of this invention and exhibiting desired anti-static properties; and FIG. 2 is a schematic representation of exemplary door stripping formed of the PVC composition of this invention and exhibiting desired anti-static properties.

DETAILED DESCRIPTION OF THE PREFERRED EXEMPLARY EMBODIMENTS

Figure 1:
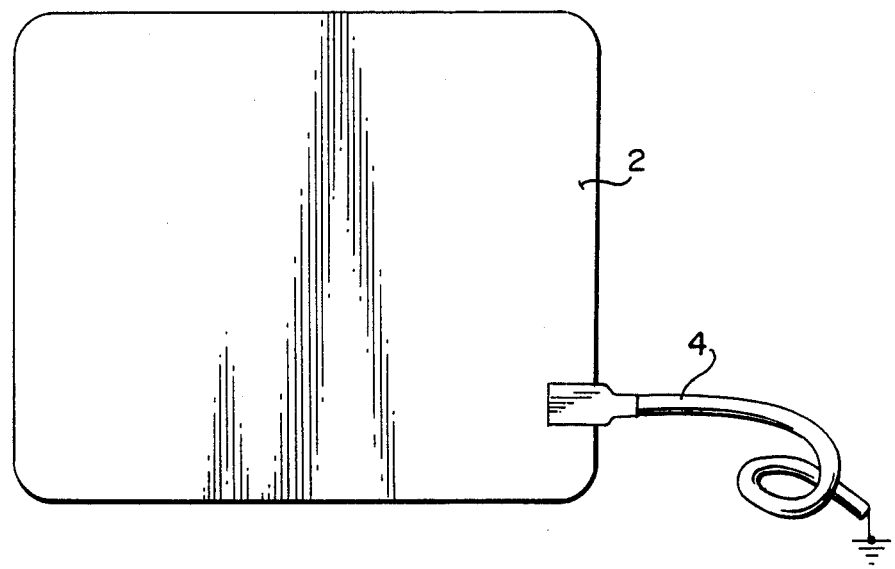

As indicated briefly above, the present invention is directed toward anti-static PVC resin compositions which include a PVC resin, a quaternary ammonium compound, and a barium-cadmium-zinc stabilizer. Optionally, the compositions of this invention also include a plasticizer, and more preferably, a blend of plasticizers. The components employed to form the compositions of this invention are all commercially available and may be blended together using conventional equipment in the plastics art. However, the present applicant is believed to be the first to discover the critical need of employing a barium-cadmium-zinc stabilizer in a PVC composition which also contains a quaternary ammonium salt as an anti-static agent.

Any conventional PVC resin commercially available may satisfactorily be employed in the practice of this invention. Preferably, the PVC resin is at least a semi-rigid resin having a PHR of below about 22. However, it may be more rigid or more flexible, depending upon the specific end-use application. Advantageously, a medium to high molecular weight PVC homopolymer is employed having a narrow rage of particle sizes, a relatively uniform porosity, excellent heat stability, good clarity and is characterized by rapid plasticizer absorption. For example, one suitable PVC resin has (i) an apparent density of 32.5 (ASTM D-1895); (ii) a cell classification of GP4-15433 (ASTM D-1755); (iii) inherent viscosity of 0.92 (ASTM D-1234); (iv) a K-value of 67 (DIN 53726); (v) a particle size pursuant to ASTM D-1921 of 99.5% through 40 mesh (minimum) and 2% through 200 mesh (maximum); and (vi) as minimal as possible volatile monomer content (e.g., less than 0.3% volatile monomer content). The preferred PVC resin will be in the form of a free-flowing powder at room temperature (visual observation).

The anti-static agent employed in the compositions of this invention include quaternary ammonium compounds of the formula:

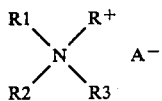

where R, R1, R2 are hydroxyalkylene radicals, R3 is an alkyl radical, and A is an anion. The organic radicals R, R1, R2, and R3 can, and do, differ in length.

Preferably, R1 and R2 are each hydroxyethylene radicals (i.e., $HOCH_2CH_2-$); R is a radical of 3-(2'-hydroxyoctyloxypropal) (i.e., $C_2H_{17}OCH_2CHOHCH_2-$); R3 is methyl; and A is methosulfate (i.e., $CH_3OSO_3-$). Particularly preferred is a mixture having between about 5 to about 10% by weight (on a solvent free basis) of the non-ionic anti-static quaternary ammonium compound as defined immediately above, and a polyethyl alcohol represented by the formula $R'(OCH_2CH_2)_nOH$, in which R' is an alkyl group having 12 to 15 carbon atoms and n is a number whose average value is 7.

The preferred quaternary ammonium compound employed as an anti-static agent in the PVC resin compositions of this invention is commercially available from Argus Division of the Witco Company under the tradename Markstat TM AL-46.

The stabilizer employed in the practice of this invention is critically required to be a barium-cadmium-zinc composition. The preferred stabilizers are organo barium-cadmium-zinc compositions—that is the barium, cadmium and zinc will be blended in liquid organic solvents, usually aliphatic and/or aromatic solvents. Usually, the stabilizer will contain between about 1.0 to 5.0 wt. % of barium, between about 0.5 to about 2.5 wt % of cadmium and between about 0.01 to about 1.0 wt % of zinc. Phosphorus (as organic phosphite) may also be present in the stabilizer blends in an amount less than about 2.5 wt. %. The preferred stabilizers will exhibit a specific gravity of less than about 1.033 (water=1.0); an evaporation rate of less than 1 (butyl acetate=1); and a viscosity SUS at 100° F. of less than 100.

The barium-cadmium-zinc stabilizers described above are commercially available, for example, from the Argus Division of the Witco Company under the tradename MARK TM 7562 and 7516; and from the Chemical Division of the Ferro Corporation under the trademark THERM-CHECK ® 6159.

The stabilizer is advantageously added to the PVC resin as a dispersion in a thermosetting resin, such as an epoxy resin. Usually, the stabilizer and epoxy resin will each be present in an amount of about 50 wt. %. One particularly preferred epoxy resin for this purpose is an epoxidized soybean oil commercially available from the Argus Division of the Witco Company under the trademark DRAPEX ® 6.8.

Plasticizers are also employed in the compositions of this invention. In general, the plasticizers that are employed should have boiling points in excess of the temperatures employed during the processing of the PVC compositions in which they are blended. Usually, the plasticizers employed in the practice of this invention will be a blend of two or more individual plasticizers. For example, it has been found that a plasticizer blend comprised of substantially equal weight percentages of DOP (i.e., dioctylphthalate [bis(2-ethylhexyl) phthalate]) and DOA (i.e., dioctyladipate [bis(2-ethylhexyl) adipate]) performs with the other components in the PVC compositions described above.

Other components, such as processing aids, pigments, fillers, and the like, may also be employed in the PVC resin compositions of this invention. For example, lubricants may be employed in the PVC compositions as processing aids. Preferred are fatty acid lubricants, with stearic acid being one particularly preferred example. Vinyl pigment dispersions may also be blended with the PVC resin so as to provide for a relatively clear article or one having a desired color characteristic. As a non-limiting example, a vinylized tinting violet pigment dispersion may be employed.

The compositions of this invention will comprise between about 90 to about 110 parts by weight of a PVC resin, between about 8 to about 16 parts by weight of a barium-cadmium-zinc stabilizer, and between about 6 to about 13 parts by weight of an ionic anti-static agent, all as above defined. In addition to these components, the compositions of this invention will preferably include between about 10 to about 20 parts by weight of a blend of plasticizers, and if desired, between about 0.05 to about 1.3 parts by weight of a lubricant and/or between about 0.016 to about 0.056 parts by weight of a pigment toner. The plasticizer blend employed in the compositions of this invention is comprised of both DOP and DOA, with the percentage of DOP to DOA ranging between about 40 to about 50.

The compositions of the present invention may be formulated by introducing the PVC resin into a conventional resin blending apparatus and raising the temperature thereof to about 40° C. The other components may then be introduced into the apparatus and blended into a substantially homogenous mixture (typically termed a "dry mixture" in art parlance). The dry mixture may then be cooled and subsequently introduced into a convention screw extruder. The extrudate may then be pelletized for downstream introduction into a product forming extruder.

Figure 2:
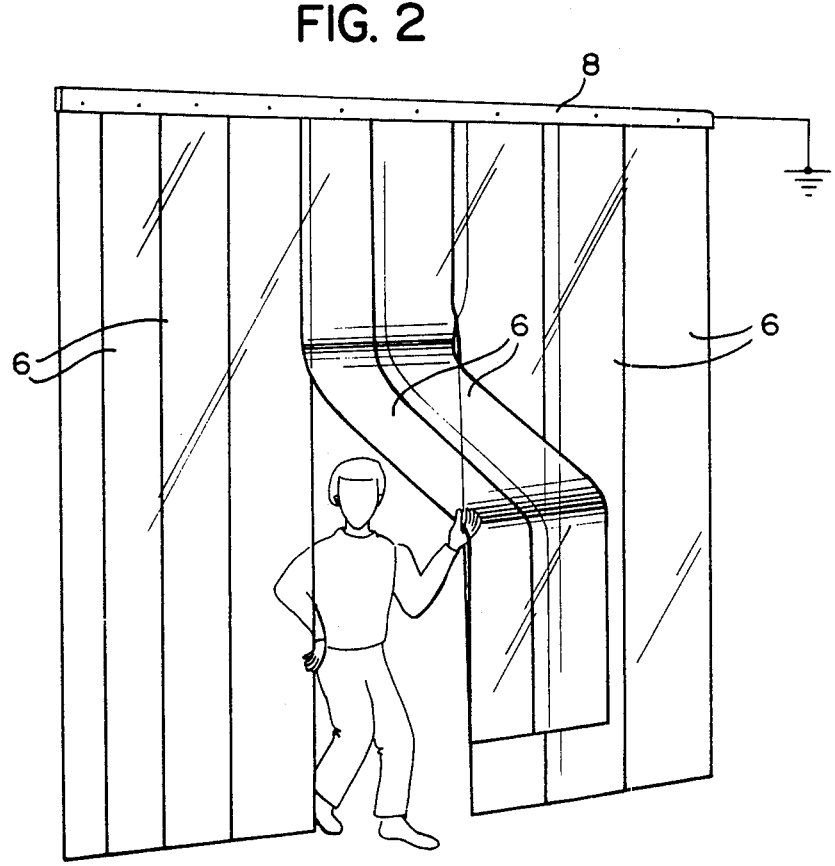

In use, the finished shaped products formed of the anti-static compositions of this invention prevent static electricity build-up with its attendant potential for damage to sensitive electronic office, computer and/or medical equipment. For example, as is shown in accompanying FIG. 1, a person standing on a work surface mat 2 formed of the compositions of this invention will have their static electricity dissipated thereto almost instantly upon stepping on, or touching the work surface mat 2. The mat 2 is grounded via ground wire 4 so as to ensure satisfactory static-charge dissipation. In a similar manner as is shown in accompanying FIG. 2, the compositions of this invention may advantageously be formed into door strippings 6. In the embodiment of the invention shown in FIG. 2, the metal support strip 8 is grounded as shown.

In all embodiments of this invention, the static electricity is reduced to a harmless level of less than 500 volts in less than about 0.5 seconds, and all static electricity is essentially dissipated within a few seconds thereafter. This rate of static electricity dissipation is surprisingly and unexpectedly greater than that commonly associated with conventional or commercially available anti-static mats for office environments.

A variety of tests are known which measure the dissipation of static electricity. One such test is the old ASTM F 150-72 which utilizes a conventional 1hmmeter to measure the surface resistance between two five-pound electrodes positioned three feet apart on the floor or the floor-to-ground resistance between a single electrode and a ground connection. A more meaningful test is Federal Test Method Standard 101B, Method 4046 wherein a 5000 volt charge is applied to the surface of a plastic, the maximum charge accepted is measured, and then the time required to dissipate the charge once the sample is grounded is measured. Another test for such purposes is MIL 13-81705B. In evaluating anti-static work surface mats, surface resistivity and volume-resistivity are indices useful in evaluating a given mat.

The present invention will be further described by way of the following non-limiting Examples.

EXAMPLE I

An exemplary chair mat composition according to the present invention is set forth below:

TABLE I

| Chemicals | Parts by Weight |
|---|---|
| PVC Resin | 450.00 |
| DOP/DOA Blend | 67.50 |
| Anti-static Agent (AL-46) | 36.00 |
| Stabilizer And Epoxy Blend | 45.0 |
| Stearic Acid Lubricant | 1.35 |
| Violet Toner | .16 |

This composition was formulated in the following fashion.

The PVC resin was introduced into a resin blender and heated until 140° F. The DOP/DOA blend along with a stabilizer/epoxy blend were admixed thereinto. In the same step the anti-static agent was also introduced into the blender. The blender temperature was then raised to about 175° F. The lubricant and toner were then added. Admixing continued thereafter until a temperature of 210° F. was obtained. The temperature was then reduced, by cooling the blender, until a temperature of about 95° F. was reached. A dry blended composition was thus obtained.

The dry blended composition was recovered and extruded at a temperature of 350° F. to 360° F. to obtain a clear sheet. The sheet was cooled and pelletized. The pellets thus obtained were then introduced into another extruder, fused, and extruded through an orifice to obtain an anti-static mat.

Testing of the anti-static mat, grounded, revealed that static electricity was reduced to a harmless level of less than 500 volts within 0.5 seconds and all undesired static electricity buildup in the mat was dissipated within fractions of seconds thereafter.

The composition of Example 1 is processed in a manner to that stated therein to obtain an anti-static mat wherein the underside of the mat had hundreds of tiny rigid protrusions. The protrusions held the mat firmly in place on carpeted surfaces.

EXAMPLE II

An exemplary composition useable to form anti-static door strippings according to the present invention is set forth as follows:

TABLE II

| Resin | 350.00 |
|---|---|
| DOP | 140.00 |
| AL-46 | 13.50 |
| Stab/Epoxy | 13.50 |
| Santicizer 141 | 13.50 |
| Stearic Acid | .88 |
| UV-1413 | .44 |
| DR 153 Toner | .14 |
| Total | 536.96 |

EXAMPLE III

The preferred barium-cadmium-zinc stabilizer blended with polyvinyl chlorine resin was examined against other known PVC stabilizers in PVC blends. Dry mixtures of the following components were prepared generally in accordance with the procedures of Example I above (all components being expressed in parts by weight:

| PVC Resin | 450.00 grams |
|---|---|
| Anti-Static Agent* | 36.00 grams |
| Stabilizer** | 45.00 grams |
| Plasticizer Blend*** | 67.50 grams |
| Stearic Acid Lubricant | 1.35 grams |
| Violet Toner | 0.16 gram |

Notes:
*MARKSTAT ™ AL-46
**Introduced into dry mixture as a 50/50 blend with epoxidized soybean oil.
***50/50 Blend of DOP/DOA In sample E1 and Comparative Samples CS1-CS6, the following stabilizers were employed:

| Sample | Stabilizer |
|---|---|
| E1 | Organo Barium-cadmium-zinc (MARK ™ 7562 Argus Div. of Witco Co.) |
| CS1 | Lead Stearate (STAYRITE ™ 10; Argus Div. of Witco Co.) |
| CS2 | Organo calcium-zinc (MARK ™ 3023; Argus Div. of Witco Co.) |
| CS3 | Alkyltin Mercapto (MARK ™ 1900; Argus Div. of Witco Co.) |
| CS4 | Organo Tin (THERMOLITE ™ 892; M & T Chemicals) |
| CS5 | Organo Tin (THERMOLITE ™ 890; M & T Chemicals) |
| CS6 | di-n-octyltin maleate (THERMOLITE ™ 813-831; M&T Chemicals) |

Dry mixtures of the blends of sample E1 and comparative samples CS1-CS6 were each subjected to a milling test in order to subject the resin blends to conditions simulating those of a screew extruder. The milling test therefore provided an indication of the stability and processability of the resin blends under extruder processing conditions.

In this regard, the dry blends were introduced into the nip defined between a pair of milling cylinders (each being 6 inches in diameter by 13 inches in length) heated to about 340° F. The nip between the rollers was adjustable. Initially "zero nip" (i.e. no space) existed between the rollers. As the dry mixture began to melt (under the heat and friction of the rollers) the nip was adjusted until a layer of molten PVC passed therethrough and a band of this molten PVC wrapped around one of the rollers. The rollers were then operated for a period of time after such "band wrapping" and the processability, visual appearance and thermal stability characteristics were observed at periodic (fifteen minute) time intervals. The results appear in Table III below.

TABLE III

| SAMPLE | PROCESS-ABILITY | VISUAL APPEARANCE | ANTISTATIC PROPERTIES | NOTES |
|---|---|---|---|---|
| E1 | Good | Clear | Good | 1 |
| CS1 | N/A | N/A | N/A | 2 |
| CS2 | Poor | Cloudy | Good | 3 |
| CS3 | Poor | Clear | Good | 4 |
| CS4 | Poor | Clear | Good | 5 |
| CS5 | Poor | Very slight change | Good | 6 |
| CS6 | Poor | Yellow | Good | 7 |

Notes:
1. Severe degradation did not occur until 45 minutes of mill testing. All results acceptable.
2. Resin would not bend to roll during mill testing. Unacceptable.
3. Cloudy after 15 min. of mill testing; pale yellow after 30 min. of mill testing. Unacceptable.
4. Resin became glutinous after 45 min. of mill testing. Unacceptable.
5. Resin became glutinous after 30 min. of mill testing. Test discontinued. Unacceptable.
6. Severe resin degradation after 15 min. of mill testing unacceptable.

As the above data demonstrate, barium-cadmium-zinc stabilizer is critically required in order to satisfactorily process, via extrusion, a PVC resin blended with a quaternary ammonium compound as an anti-static agent.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An extrudable, anti-static polyvinyl chloride resin composition, consisting essentially of:
   (i) between about 90 to about 110 parts by weight of a polyvinyl chloride resin;
   (ii) between about 8 to about 16 parts by weight of a barium-cadmium-zinc stabilizer; and
   (iii) between about 6 to about 13 parts by weight of an ionic anti-static agent comprised of a quaternary ammonium compound of the formula:

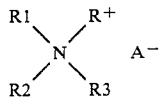

where R, R1, and R2 are hydroxyalkylene radicals, R3 is an alkyl radical, and A is an anion, and wherein
   (iv) said barium-cadmium-zinc stabilizer is present in the form of a blend of between about 1.0 to about 5.0 wt. % barium, between about 0.5 to about 2.5 wt. % cadmium, and between about 0.01 to about 1.0 wt. % zinc in an organic solvent for the same, and has a specific gravity of less than about 1.033 with the specific gravity of water being equal to 1.0, an evaporation rate of less than 1 with the evaporation rate of butyl acetate being equal to 1, and a viscosity SUS at 100° F. of less than 100.

2. A composition as in claim 1, wherein R1 and R2 are each hydroxyethlene radicals, R is a radical of 3-(2'-hydroxyoctyloxypropal), R3 is methyl, and A is methosulfate.

3. A composition as in claim 1 or 2, wherein said anti-static agent is a mixture consisting of between about 5 to about 10% by weight of said quaternary ammonium compound, and a polyethyl alcohol represented by the formula R'(OCH$_2$CH$_2$)$_n$OH, where R' is an alkyl group having 12 to 15 carbon atoms, and n is a number whose average value is 7.

4. A composition as in claim 1 or 2, further consisting essentially of between about 10 to about 20 parts by weight of a plasticizer blend, which plasticizer blend consists of dioctylphthalate, and dioctyl adipate.

5. A composition as in claim 4, wherein the percentage of said dioctylphthalate to said dioctyl adipate, is between about 40 to 50.

6. A composition as in claim 5, which further consists essentially of between about 0.05 to about 1.3 parts by weight of a lubricant, and between about 0.016 to about 0.56 parts by weight of a color toner.

7. A shaped article exhibiting anti-static properties which consists essentially of:
   (i) about 90 to about 110 parts by weight of a polyvinyl chloride resin;
   (ii) between about 8 to about 16 parts by weight of a barium-cadmium-zinc stabilizer; and
   (iii) between about 6 to about 13 parts by weight of an ionic anti-static agent comprised of a quaternary ammonium compound of the formula;

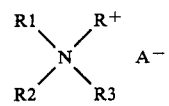

where R, R1, R2 are hydroxyalkylene radicals, R3 is an alkyl radical, and A is an anion, wherein
   (iv) said anti-static agent is present in said article in an amount sufficient to dissipate static electricity to less than 500 volts in less than about 0.05 seconds, and wherein
   (v) said barium-cadmium-zinc stabilizer is present in the form of a blend of between about 1.0 to about 5.0 wt. % barium, between about 0.5 to about 2.5 wt. % cadmium, and between about 0.01 to about 1.0 wt. % zinc in an organic solvent for the same, and has a specific gravity of less than about 1.033 with the specific gravity of water being equal to 1.0, an evaporation rate of less than 1 with the evaporation rate of butyl acetate being equal to 1, and a viscosity SUS at 100° F of less than 100.

8. A shaped article as in claim 7, wherein R1 and R2 are each hydroxyethylene radicals, R is a radical of 3-(2'-hydroxyoctyloxypropal), R3 is methyl, and A is methosulfate.

9. A shaped article as in claim 7 or 8, wherein said anti-static agent is a mixture consisting of between about 5 to about 10% by weight of said quaternary ammonium compound, and a polyethyl alcohol represented by the formula $R'(OCH_2CH_2)_nOH$, where $R'$ is an alkyl group having 12 to 15 carbon atoms, and n is a number whose average value is 7.

10. A shaped article as in claim 7 or 8, further consisting essentially of between about 10 to about 20 parts by weight of a plasticizer blend, which plasticizer blend consists of dioctylphthalate, and dioctyl adipate.

11. A shaped article as in claim 10, wherein the percentage of said dioctylphthalate to said dioctyl adipate, is between about 40 to 50.

12. A shaped article as in claim 11, which further consists essentially of between about 0.05 to about 1.3 parts by weight of a lubricant, and between about 0.016 to about 0.56 parts by weight of a color toner.

13. A composition as in claim 4, wherein said dioctyl phthalate is bis (2-ethylhexyl)phthalate, and wherein said dioctyl adipate is bis (2-ethylhexyl)adipate.

14. A shaped article as in claim 10, wherein said dioctyl phthalate is bis (2-ethylhexyl)phthalate, and wherein said dioctyl adipate is bis (2-ethylhexyl)adipate.

* * * * *